United States Patent
Yong et al.

(10) Patent No.: US 12,222,219 B2
(45) Date of Patent: Feb. 11, 2025

(54) UAV NAVIGATION CALIBRATION METHOD, NON-TRANSITORY COMPUTER-READABLE STORAGE MEDIUM AND UAV IMPLEMENTING THE SAME

(71) Applicant: Shenzhen Reolink Technology Co., Ltd., Shenzhen (CN)

(72) Inventors: Sheng Yong, Shenzhen (CN); Xiaoyu Liu, Shenzhen (CN); Rui Zhou, Shenzhen (CN); Yulong Que, Shenzhen (CN)

(73) Assignee: Shenzhen Reolink Technology Co., Ltd., Shenzhen (CN)

( * ) Notice: Subject to any disclaimer, the term of this patent is extended or adjusted under 35 U.S.C. 154(b) by 345 days.

(21) Appl. No.: 17/945,047

(22) Filed: Sep. 14, 2022

(65) Prior Publication Data

US 2023/0048250 A1 Feb. 16, 2023

Related U.S. Application Data

(63) Continuation-in-part of application No. 17/567,834, filed on Jan. 3, 2022, now abandoned.

(30) Foreign Application Priority Data

Aug. 16, 2021 (CN) .......................... 202110935274.X

(51) Int. Cl.
| | |
|---|---|
| *G01C 25/00* | (2006.01) |
| *B64C 39/02* | (2023.01) |
| *G01C 21/20* | (2006.01) |
| *G05D 1/00* | (2006.01) |

(52) U.S. Cl.
CPC ............ *G01C 25/00* (2013.01); *B64C 39/024* (2013.01); *G01C 21/20* (2013.01); *G05D 1/101* (2013.01); *B64U 2201/10* (2023.01)

(58) Field of Classification Search
CPC ........ G01C 25/00; G01C 21/20; G05D 1/101; B64U 2201/10; B64C 39/024
See application file for complete search history.

(56) References Cited

U.S. PATENT DOCUMENTS

| | | | |
|---|---|---|---|
| 7,690,240 B2 * | 4/2010 | Mattar | G01F 1/8486 73/1.34 |
| 8,682,610 B2 * | 3/2014 | Landers | G01C 21/1654 702/93 |
| 2015/0272480 A1 * | 10/2015 | Senta | G01P 15/18 600/595 |

* cited by examiner

*Primary Examiner* — Elias Desta
(74) *Attorney, Agent, or Firm* — ScienBiziP, P.C.

(57) ABSTRACT

This application discloses a calibration method for navigation of an unmanned aerial vehicle (UAV), a non-transitory computer-readable storage medium and a UAV implementing the same. The calibration method includes: collecting, during a flight of the UAV, reference data during two measurements of a reference vector performed by a vector sensor; acquiring a zero-point offset $M_0$ of the vector sensor according to the reference data; acquiring original data $R_k$ of any vector measured by the vector sensor; acquiring valid data $V_k$ according to the zero-point offset $M_0$ and the original data $R_k$; and control headings and postures of the UAV according to the valid data $V_k$. With the calibration method in this application, the valid data $V_k$ is defined as a vector data acquired after a zero-point error of the original data $R_k$ is eliminated, which is more closely approximated to an actual value of a to-be-measured vector.

6 Claims, 5 Drawing Sheets

02 — Acquiring a zero-point offset according to a reference vector value Me, an angular displacement vector θ, first measurement data, and second measurement data — 021

UAV NAVIGATION CALIBRATION METHOD, NON-TRANSITORY COMPUTER-READABLE STORAGE MEDIUM AND UAV IMPLEMENTING THE SAME

CROSS-REFERENCE TO RELATED APPLICATIONS

The present application is continuation-in-part of the U.S. Non-Provisional patent application Ser. No. 17/567,834, filed Jan. 3, 2022, which claims priority from the Chinese Invention Patent Application No. 202110935274.X filed Aug. 16, 2021. The disclosures of which are incorporated herein by reference in their entireties.

FIELD OF THE INVENTION

This application relates to the field of unmanned aerial vehicle (UAV) navigation sensors, and more specifically, to a calibration method for navigation of an unmanned aerial vehicle (UAV) a non-transitory computer-readable storage medium and a UAV implementing the same.

BACKGROUND OF THE INVENTION

During a flight of a UAV, to provide precise navigation paths, various types of vector sensor are required to measure headings and postures of the UAV in real tune. A vector sensor can provide a direction and a size of a to-be-measured physical quantity. For example, a three-axis magnetoresistive sensor capable of measuring the direction of the earth magnetic field is used to manufacture a compass to achieve azimuth measurement. For another example, a three-axis acceleration sensor capable of measuring the gravity acceleration of the earth provides an angle of inclination relative to a horizontal plane. However, when the to-be-measured physical quantity is zero, data output of a sensor is often not zero, that is, a zero-point error exists, accuracy of UAV navigation is affected.

SUMMARY OF THE INVENTION

According to the first aspect of the present invention, an unmanned aerial vehicle (UAV) is provided. The UAV comprises a vector sensor for measuring headings and postures of the UAV; and one or more processors configured to: collect, during a flight of the UAV, reference data during two measurements of a reference vector performed by the vector sensor, wherein modulus of the reference vector is known; acquire a zero-point offset $M_0$ of the vector sensor according to the reference data, wherein the zero-point offset $M_0$ is a vector difference between a theoretical zero-point position $P_0$ and a measurement zero-point position Pe of the vector sensor; acquire original data $R_k$ of any vector measured by the vector sensor based on the measurement zero-point position Pe; acquire valid data $V_k$ based on the theoretical zero-point position $P_0$ according to the zero-point offset $M_0$ and the original data $R_k$; define the valid data $V_k$ as a vector data acquired by eliminating a zero-point error from the original data $R_k$; and control headings and postures of the UAV according to the valid data $V_k$. During the two measurements of the reference vector by the vector sensor, postures of the vector sensor are different, the reference data include a known reference vector value Me, an angular displacement vector θ from the posture of the vector sensor during a first measurement to the posture during a second measurement, first measurement data $M_1$ acquired by the vector sensor during the first measurement of the reference vector, and second measurement data $M_2$ acquired by the vector sensor during the second measurement of the reference vector. The processors are further configured to acquire the zero-point offset $M_0$ according to the reference vector value Me, the angular displacement vector θ, the first measurement data $M_1$, and the second measurement data $M_2$.

According to the second aspect of the present invention, a calibration method for navigation of an unmanned aerial vehicle (UAV) is provided. The UAV includes a vector sensor for measuring headings and postures of the UAV The calibration method comprises: collecting, during a flight of the UAV, reference data during two measurements of a reference vector performed by the vector sensor, wherein modulus of the reference vector is known; acquiring a zero-point offset $M_0$ of the vector sensor according to the reference data, wherein the zero-point offset $M_0$ is a vector difference between a theoretical zero-point position $P_0$ and a measurement zero-point position Pe of the vector sensor; acquiring original data $R_k$ of any vector measured by the vector sensor based on the measurement zero-point position Pe; acquiring valid data $V_k$ based on the theoretical zero-point position $P_0$ according to the zero-point offset $M_0$ and the original data $R_k$; defining the valid data $V_k$ as a vector data acquired by eliminating a zero-point error from the original data $R_k$; and controlling headings and postures of the UAV according to the valid data $V_k$. During the two measurements of the reference vector by the vector sensor, postures of the vector sensor are different, the reference data include a known reference vector value Me, an angular displacement vector θ from the posture of the vector sensor during a first measurement to the posture during a second measurement, first measurement data $M_1$ acquired by the vector sensor during the first measurement of the reference vector, and second measurement data $M_2$ acquired by the vector sensor during the second measurement of the reference vector. The acquiring the zero-point offset $M_0$ of the vector sensor according to the reference data comprises: acquiring the zero-point offset $M_0$ according to the reference vector value Me, the angular displacement vector θ, the first measurement data $M_1$, and the second measurement data $M_2$.

In the third aspect, a non-transitory computer-readable storage medium storing a computer program is provided. When the computer program is executed by one or more processors, the calibration method for navigation of an unmanned aerial vehicle (UAV) is implemented.

According to the calibration method for navigation of an unmanned aerial vehicle (UAV), the non-transitory computer-readable storage medium and the UAV implementing the same, the zero-point offset $M_0$ of the vector sensor can be acquired according to the reference data during the two measurements of the reference vector during a flight of the UAV, and the valid data $V_k$ is acquired by the vector sensor according to the original data $R_k$ and the zero-point offset $M_0$. The valid data $V_k$ is defined as a vector data obtained after a zero-point error of the original data $R_k$ is eliminated, which is more closely approximated to an actual value of a to-be-measured vector. Headings and postures of the UAV is controlled according to the valid data $V_k$. Therefore, accuracy of UAV navigation is improved. Moreover, the entire calibration process is carried out in flight state of the UAV without manual intervention, and the calibration method is efficient and convenient.

Additional aspects and advantages of the implementations of this application are provided in the following description.

BRIEF DESCRIPTION OF THE DRAWINGS

The foregoing and/or additional aspects and advantages of this application will become apparent and comprehensible from the following descriptions of the embodiments with reference to the accompanying drawings, where.

DETAILED DESCRIPTION

The following describes implementations of this application in detail. Examples of the implementations are shown in the accompanying drawings, and same or similar reference signs in all the accompanying drawings indicate same or similar components or components having same or similar functions. The implementations that are described with reference to the accompanying drawings are exemplary, and are only used to explain implementations of this application and cannot be construed as a limitation to implementations of this application.

Figure 1:
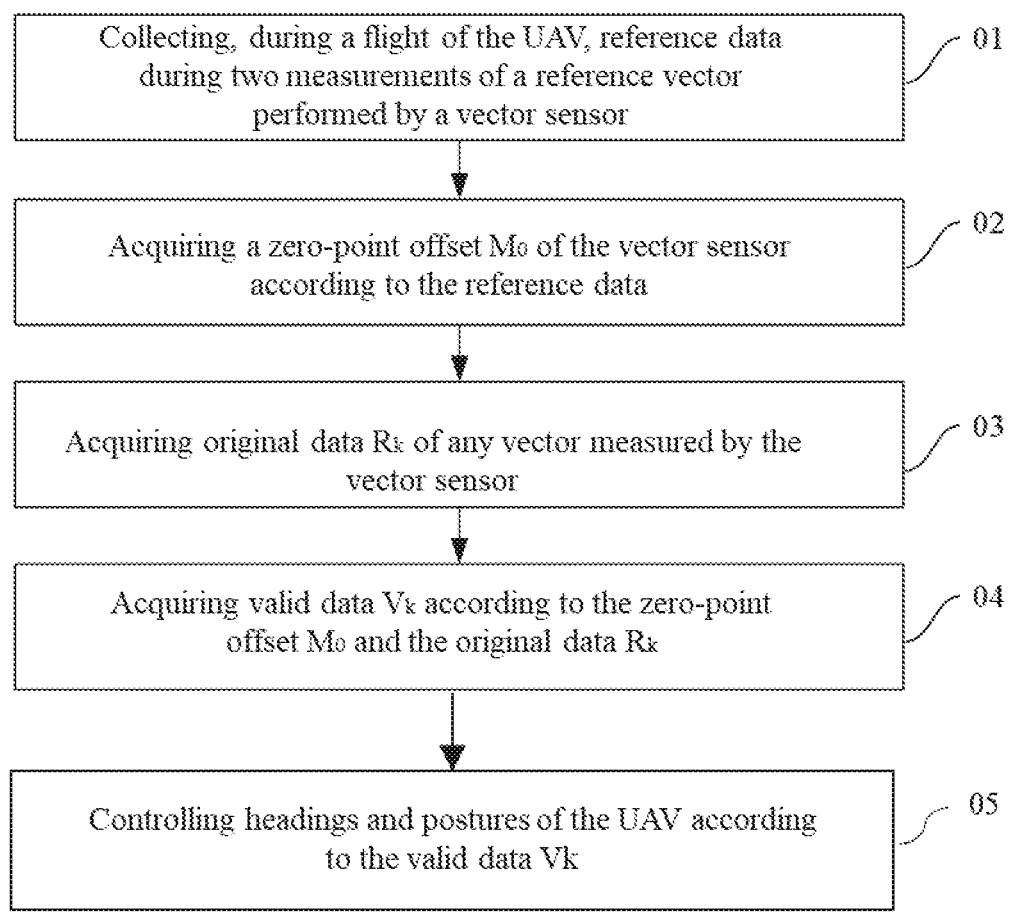
FIG. 1 is a schematic flowchart of a calibration method for navigation of an UAV according to some implementations of this application.
Figure 2:
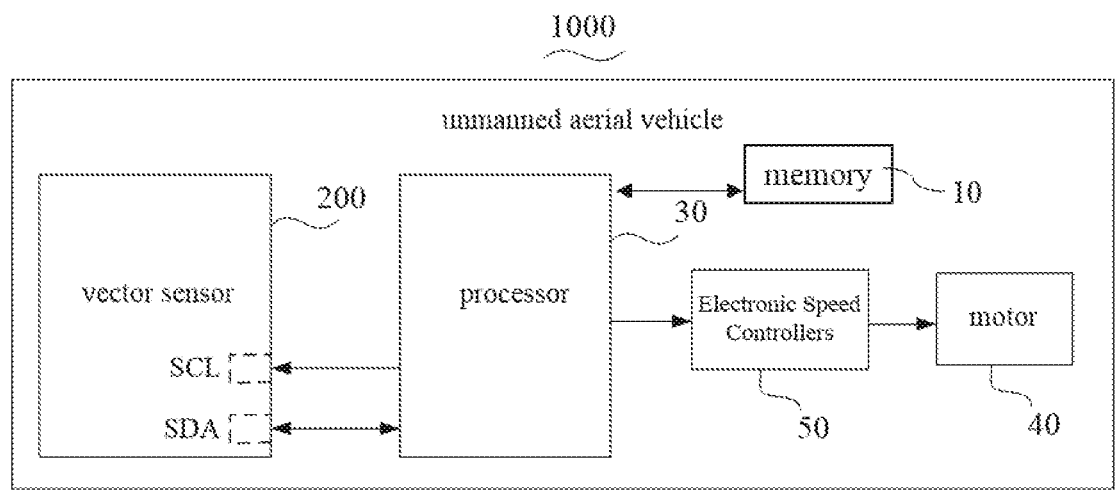
FIG. 2 is a schematic structural diagram of an UAV according to some implementations of this application.

Referring to FIG. 1 and FIG. 2, an implementation of this application provides a calibration method for navigation of an UAV 1000 including a vector sensor 200. The vector sensor 200 is configured for measuring headings and postures of the UAV. The calibration method includes the following steps.

01: Collecting, during a flight of the UAV, reference data during two measurements of a reference vector performed by a vector sensor 200.

02: Acquiring a zero-point offset $M_0$ of the vector sensor 200 according to the reference data.

03: Acquiring original data $R_k$ of any vector measured by the vector sensor.

04: Acquiring valid data $V_k$ according to the zero-point offset $M_0$ and the original data $R_k$.

05: Controlling headings and postures of the UAV according to the valid data $V_k$.

Referring to FIG. 2, an implementation of this application further provides an UAV 1000 implementing the calibration method. The UAV 1000 includes one or more vector sensors 200, a processor 30, a memory 10, one or more electric motors 40 and one or more electronic speed controllers (ESCs) 50. Each ESC 50 acts as interface between the processor 30 and a corresponding electric motor 40. The processor 30 acts as a master and the vector sensors act as slaves. Each of the vector sensors 200 may include a serial clock (SCL) pin and a serial data (SDA) pin corresponding respectively to a serial clock line and a serial data line over a I2C bus used communicate with the processor 30.

When the SCL pin is at a high level, the processor 30 determines a binary value of a corresponding bit by detecting a level on the SDA pin, so as to collect original heading data and original posture data measured by the vector sensor 200. Then the original heading data and the original posture data are calibrated to obtain target heading data and target posture data. The processor 30 generates a control command according to the calibrated target heading data and target posture data and transmits it to the ESC. The ESC 50 is configured to control the electric motor 40 to rotate at a speed according to the control command generated by the processor 30 to drive flying motion parts (such as propellers) of the UAV 1000, so as to translate or rotate the UAV 1000, and adjust to the target heading and posture to achieve navigation calibration. That is to say, the processor 30 may be configured to: collect, during a flight of the UAV, reference data during two measurements of a reference vector performed by the vector sensor 200; acquire a zero-point offset $M_0$ of the sensor according to the reference data; acquire original data $R_k$ of any vector measured by the vector sensor 200; acquire valid data $V_k$ according to the zero-point offset $M_0$ and the original data $R_k$; control headings and postures of the UAV according to the valid data $V_k$.

In this implementation, UAV refers to any types of unmanned aerial vehicle which may be used in various fields such as aerial photography, surveillance, agriculture, plant protection, courier transportation, disaster rescue, observation of wild animals, surveying and mapping, and news reporting. For example, in home surveillance, UAVs can refer to indoor flying security cameras that fly along a customized flight path to see what is happening in the home no matter where the user is. In the field of plant protection, UAVs can refer to plant protection drones, which are used to perform spraying operations according to set flight routes, such as the spraying of pesticides. Due to external electronic equipment, magnetic field interference and other reasons, navigation system of UAV often has errors which affect the flight path planning and flight safety of the UAV. Therefore, calibration of navigation of the UAV is needed to be carried out, that is to calibrate the heading and posture of the UAV.

The vector sensor 200 may be a vector sensor 200 having two or more two axes, for example, a two-axis sensor, a three-axis sensor, a six-axis sensor, or a multi-axis sensor, which is not enumerated herein. Depending on a type of a to-be-measured vector, the vector sensor 200 may selectively be a geomagnetic sensor, a gravity acceleration sensor, an angular velocity sensor, an acceleration sensor, or the like, which is not enumerated herein. In some implementations, the vector sensor 200 may be a micro-electro-mechanical system (MEMS) sensor. The MEMS sensor may be configured to measure one or more types of vectors. For example, the MEMS sensor includes six axes, and can have functions of both a three-axis acceleration sensor and a three-axis geomagnetic sensor. The specific type of the MEMS sensor is not limited thereto, and is not enumerated herein.

In this implementation, the vector sensor 200 may be a combination sensor of a three-axis geomagnetic sensor and a three-axis acceleration sensor, for example. Since the three-axis geomagnetic sensor is a sensor for measuring heading, and the three-axis acceleration sensor is a sensor for measuring posture, Therefore, the processor 30 can collect the heading data and posture data of the UAV at any time through the combined sensor. Specifically, the original data $R_k$ may include original heading data and original posture data, the valid data $V_k$ may include the target heading data and target posture data of the UAV. The processor 30 may determine the UAV's target heading and target posture according to the valid data $V_k$, and then control the UAV to translate or rotate, so that the UAV is adjusted to have the target heading and target posture. As such, calibration of heading and posture of the UAV is realized. During the flight of the UAV, through the calibration of the headings and postures of the UAV, the accuracy of UAV navigation is improved. Moreover, the entire calibration process is carried out in flight state of the UAV, no manual intervention is required, thus efficiency and convenience of the calibration can be enhanced.

Referring to FIG. 2, in an embodiment, the processor 30 and the vector sensor 200 are integrally fabricated and dispostured. In another embodiment, the processor 30 and the vector sensor 200 are independently fabricated and dispostured. The vector sensor 200 may transmit the measurement data to the processor 30. The processor 30 acquires the zero-point offset $M_0$ of the sensor according to data measured by the vector sensor 200, and transmits the zero-point offset $M_0$ to the vector sensor 200, so that the vector sensor 200 acquires the valid data $V_k$ based on the zero-point offset $M_0$. Alternatively, the processor 30 side acquires the valid data $V_k$ according to the zero-point offset $M_0$ and the original data $R_k$ acquired by the vector sensor 200.

Generally, the zero-point offset $M_0$ exists between a theoretical zero-point position $P_0$ of the vector sensor 200 and a measurement zero-point position Pe adopted during the measurement by the vector sensor 200. Specifically, the vector sensor 200 can still acquire non-zero data when the to-be-measured vector is zero. A vector difference between the vector data acquired by the vector sensor 200 and zero-point is the zero-point offset $M_0$ of the vector sensor 200. If the vector sensor 200 adopts the theoretical zero-point position during measurement, the vector data acquired by the vector sensor 200 is zero when the to-be-measured vector is zero. That is to say, the vector data acquired by the vector sensor 200 can represent the real to-be-measured vector.

Since the zero-point offset $M_0$ is the vector difference between the theoretical zero-point position $P_0$ and the measurement zero-point position Pe, and the original data $R_k$ acquired based on the measurement zero-point position Pe can reflect the zero-point position Pe, the theoretical zero-point position $P_0$ can be determined by using the zero-point offset $M_0$ based on the original data $R_k$ acquired by the vector sensor 200 if the zero-point point offset $M_0$ can be determined, thereby the accurate valid data $V_k$ can be acquired. As the valid data $V_k$ is acquired based on an actual zero-point position of the vector sensor 200, that is, acquired after a zero-point error is eliminated.

Figure 3:
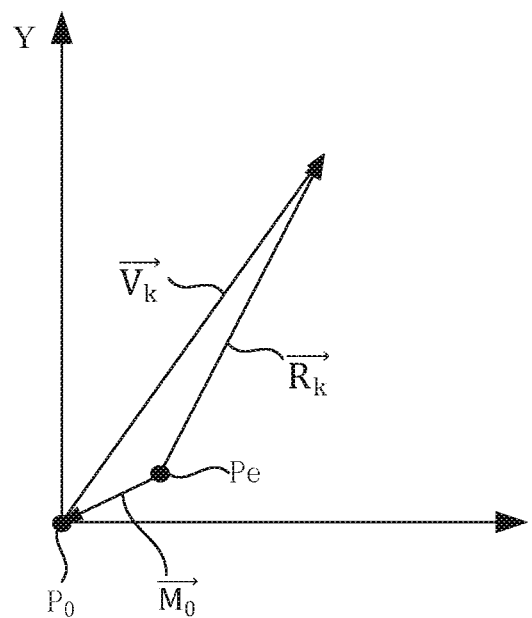
FIG. 3 is a schematic diagram of a scenario in which a vector sensor acquires original data $R_k$ and valid data $V_k$ according to some implementations of this application.

Specifically, referring to FIG. 2 and FIG. 3, the original data $\vec{R}_k$ measured by the two-axis vector sensor 200 based on the measurement zero-point position Pe is used as an example. In a coordinate system of the two-axis vector sensor 200, $P_0$ is the theoretical zero-point position, Pe is the measurement zero-point position, $\vec{M}_0$ is the vector difference between the theoretical zero-point position $P_0$ and the measurement zero-point position Pe, and $\vec{V}_k$ is theoretical vector data that can be acquired based on the theoretical zero-point position $P_0$, which is a theoretical vector after the zero-point error of $\vec{R}_k$ is eliminated. It can be learned that, $P_0 = Pe + \vec{M}_0$, and $\vec{V}_k = \vec{R}_k - \vec{M}_0$. Therefore, the zero-point error of the original data $\vec{R}_k$ can be eliminated to obtain the vector data $\vec{V}_k$ if the zero-point offset $M_0$ can be determined, and the vector data $\vec{V}_k$ is outputted as at the valid data to acquire an accurate measurement vector.

As such, in the implementations of this application, the zero-point offset $M_0$ of the vector sensor 200 can be acquired according to the reference data during the two measurements of the reference vector, and the valid data $V_k$ is acquired by the vector sensor 200 according to the original data $R_k$ and the zero-point offset $M_0$. The valid data $V_k$ is defined as vector data obtained after the zero-point error of the original data $R_k$ is eliminated, which is more closely approximated to an actual value of the to-be-measured vector.

Following is a further description with reference to the accompanying drawings.

Refer back to FIG. 1. In the method in 01: Collecting, during a flight of the UAV, the reference data during the two measurements of the reference vector performed by the vector sensor 200, the reference vector may be a vector having a known modulus length. For example, the vector sensor is a geomagnetic sensor. In this case, the reference vector is a geomagnetic vector having a known magnitude.

In some implementations, during the two measurements of the reference vector by the vector sensor 200, postures of the vector sensor 200 are different. For the vector having the known modulus length, when the vector sensor 200 measures the vector at a different posture, acquired reference data is also different. Therefore, the zero-point offset $M_0$ can be acquired according to the different reference data.

Figure 4:
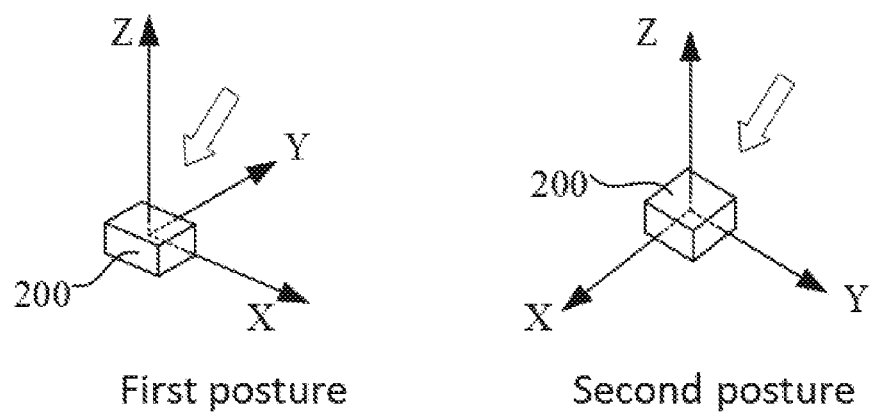
FIG. 4 is a schematic diagram of a scenario of different postures of the vector sensor according to some implementations of this application.

Referring to FIG. 4, specifically, different postures mean postures corresponding to different angles of the reference vector in a preset coordinate system relative to the vector sensor 200. For example, the vector sensor 200 is moved or rotated from a first posture to a second posture relative to a fixed reference vector. For example, the reference vector is an acceleration of gravity, and a direction of the acceleration of gravity is constant. In this case, the vector sensor 200 is moved or rotated relative to the direction of the acceleration of gravity to change the posture. For another example, the vector sensor 200 is not moved or rotated, but the reference vector is moved or rotated relative to the vector sensor 200. For example, the reference vector is an electromagnetic field vector, the vector sensor 200 is placed in a horizontal plane and kept still, and an electromagnetic field source is moved or rotated relative to the vector sensor 200. In this case, an angle of the electromagnetic field vector is changed relative to a coordinate axis of the vector sensor 200. Therefore, it is also considered that the vector sensor 200 is changed relative to the posture of the reference vector. For another example, at least one of the vector sensor 200 or the reference vector is moved or rotated relative to the other. For example, the vector sensor 200 is fixed, and the reference vector is movable, or the vector sensor 200 is movable, and the reference vector is fixed, or the vector sensor 200 and the reference vector are both movable. In all of the above cases, it is considered that the posture of the vector sensor 200 is changed relative to the reference vector.

In some implementations, the reference data includes a known reference vector value |Me|, an angular displacement vector θ from the posture of the vector sensor 200 during a first measurement to the posture during a second measurement, first measurement data $M_1$ acquired by the vector sensor 200 during the first measurement of the reference vector, and second measurement data $M_2$ acquired by the vector sensor 200 during the second measurement of the reference vector.

The reference vector value $|Me|$ is a value of a reference vector Me, that is, a magnitude of the reference vector Me. The angular displacement vector θ may be measured by using an angular displacement sensor. Specifically, when a time interval between the first measurement and the second measurement by the vector sensor 200 is relatively small, an angular rotation vector θ of the angular displacement sensor during the second measurement by the vector sensor 200 may be used as the angular displacement vector θ from the posture of the vector sensor 200 during the first measurement to the posture during the second measurement.

Figures 5, 6:
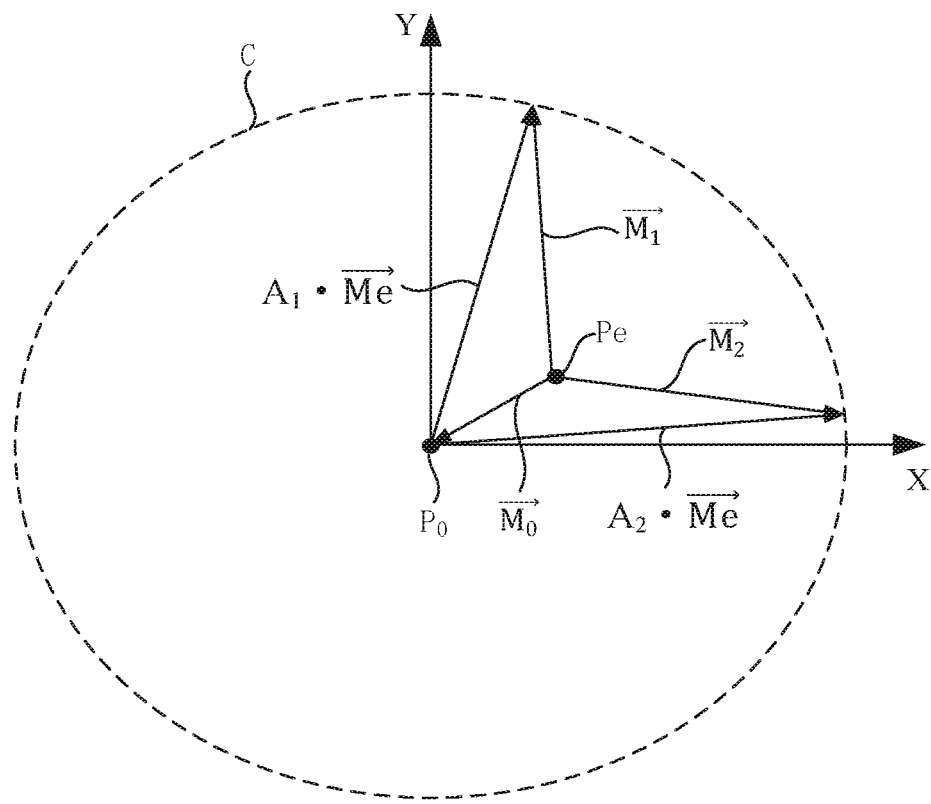
FIG. 5 is a schematic diagram of a scenario in which the vector sensor acquires a zero-point offset $M_0$ according to some implementations of this application.
FIG. 6 is a schematic flowchart of a calibration method according to some implementations of this application.

Referring to FIG. 5, for example, a two-axis vector sensor acquires first measurement data $\vec{M_1}$ and second measurement data $\vec{M_2}$ at different postures relative to the reference vector $\vec{Me}$. Since the reference vector value $|Me|$ of the reference vector $\vec{Me}$ is constant, the vector data measured based on the theoretical zero-point position $P_0$ is a vector pointing to a circumference of a circle C from the theoretical zero-point position $P_0$. The circle C is a circle having $P_0$ as a center and $|Me|$ as a radius. That is to say, a theoretical value of the first measurement data $\vec{M_1}$ with the zero-point error eliminated is $A_1 \cdot \vec{Me}$, and a theoretical value of the second measurement data $\vec{M_2}$ with the zero-point error eliminated is $A_2 \cdot \vec{Me}$, where $A_1$ is an external parameter matrix corresponding to the coordinate system of the vector sensor 200 at the first posture, $A_2$ is an external parameter matrix corresponding to the coordinate system of the vector sensor 200 at the second posture, and $A_1 \cdot \vec{Me}$ and $A_2 \cdot \vec{Me}$ illustrate an posture changing process of the vector sensor 200 relative to the reference vector.

Referring to FIG. 6, further, in some implementations, the method in 02 of acquiring a zero-point offset $M_0$ of the sensor according to the reference data includes the following steps:

021: Acquiring the zero-point offset $M_0$ according to the reference vector value Me, the angular displacement vector θ, the first measurement data $M_1$, and the second measurement data $M_2$.

Referring to FIG. 2, in some implementations, the processor 30 may be further configured to perform the method in 021. That is to say, the processor 30 may be further configured to acquire the zero-point offset $M_0$ according to the reference vector value Me, the angular displacement vector θ, the first measurement data $M_1$, and the second measurement data $M_2$.

Specifically, referring to FIG. 5, $A_1 \cdot \vec{Me}$ and $A_2 \cdot \vec{Me}$ have the following relationship:

$$A_1 \cdot \vec{Me} = \vec{M_1} - \vec{M_0};\qquad\text{Formula I}$$

$$A_2 \cdot \vec{Me} = \vec{M_2} - \vec{M_0}.\qquad\text{Formula II}$$

Formula III is obtained by using outer products of both sides of each of the equations of Formula I and Formula II.

$$|Me|^2 \cdot \sin\vec{\theta} = (\vec{M_1} - \vec{M_2}) \times \vec{M_0} - \vec{M_1} \times \vec{M_2}.\qquad\text{Formula III}$$

In Formula III, $|Me|$ is a modulus length (which is a constant) of the known reference vector $\vec{Me}$, $\vec{\theta}$ is the angular displacement vector within the time interval between the two measurements, and the first measurement data $\vec{M_1}$ and the second measurement data $\vec{M_2}$ are both measured by the vector sensor 200. Therefore, $\vec{M_0}$ in Formula III is the unique unknown quantity. The acquired known quantities may be substituted into Formula III to obtain the zero-point offset $\vec{M_0}$.

Referring to FIG. 1 and FIG. 4, after the zero-point offset $\vec{M_0}$ is acquired, during measurement of any vector by the vector sensor 200 at any postures, the valid data $\vec{V_k}$ with the zero-point error eliminated may be acquired according to original data $\vec{R_k}$ acquired by the vector sensor 200 by measuring any vector and the zero-point offset $\vec{M_0}$, so as to acquire the vector data obtained based on the theoretical zero-point position $P_0$ of the sensor, that is, the valid data $\vec{V_k}$, thereby realizing the zero-point calibration of the vector sensor 200.

Likewise, when the vector sensor 200 is a vector sensor 200 having more than two axes, the zero-point offset $M_0$ of the vector sensor 200 can still be acquired by means of the calibration method in the implementations of this application, so as to acquire the valid data $V_k$ with the zero-point error eliminated according to the zero-point offset $M_0$ and the original data $R_k$ measured by the vector sensor 200.

Figure 7:
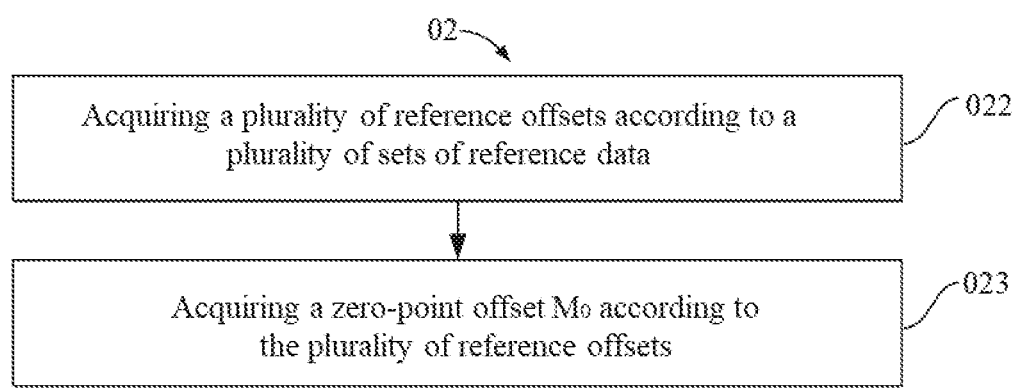
FIG. 7 is a schematic flowchart of a calibration method according to some implementations of this application.

Referring to FIG. 7, in some implementations, Method 02 of acquiring the zero-point offset $M_0$ of the sensor according to the reference data further includes the following steps:

022: Acquiring a plurality of reference offsets according to a plurality of sets of reference data.

023: Acquiring the zero-point offset $M_0$ according to the plurality of reference offsets.

Referring to FIG. 2, in some implementations, the processor 30 may be further configured to perform the methods in 022 and 023. That is to say, the processor 30 may be further configured to acquire the plurality of reference offsets according to the plurality of sets of reference data, and acquire the zero-point offset $M_0$ according to the plurality of reference offsets.

Specifically, in some implementations, in order to acquire an accurate zero-point offset $M_0$, a plurality of sets of measurements may be performed to acquire a plurality of reference offsets, and the zero-point offset $M_0$ is acquired according to the plurality of reference offsets. Referring to FIG. 7, reference data of each set of measurements includes a known reference vector value $|Me|$, an angular displacement vector θ from an posture of the vector sensor 200 during a first measurement to an posture during a second measurement in the set of measurements, first measurement data $M_1$ acquired by the vector sensor 200 during the first measurement of the reference vector in the set of measurements, and second measurement data $M_2$ acquired by the vector sensor 200 during the second measurement of the reference vector in the set of measurements. Referring to Formula III, the reference offset $\vec{N_1}$ may be determined according to the following formula: $|Me|^2 \cdot \sin\vec{\theta} = (\vec{M_1} - \vec{M_2}) \times \vec{N_1} - \vec{M_1} \times \vec{M_2}$, where i is a natural number greater than 0, and the reference offset $\vec{N_1}$ is a reference offset acquired by an $i^{th}$ set of measurements.

In an embodiment, an average value of the plurality of reference offsets $\vec{N_1}$ may be used as the zero-point offset $\vec{M_0}$.

For example, the vector sensor 200 is a two-axis sensor. The vector sensor 200 performs 3 sets of measurements on the reference vector and then acquires a reference offset $\vec{N}_1$, a reference offset $\vec{N}_2$, and a reference offset $\vec{N}_3$. A component of the zero-point offset $\vec{M}_0$ on a Y axis of the vector sensor 200 is expressed as $\vec{M}_{0,y}=(\vec{N}_{1,y}+\vec{N}_{2,y}+\vec{N}_{3,y})/3$, where $\vec{N}_{1,y}$, $\vec{N}_{2,y}$, and $\vec{N}_{3,y}$ are respectively components of the reference offset $\vec{N}_1$, the reference offset $\vec{N}_2$, and the reference offset $\vec{N}_3$ on the Y axis of the vector sensor 200. A component of the zero-point offset $\vec{M}_0$ on an X axis of the vector sensor 200 is expressed as $\vec{M}_{0,x}=(\vec{N}_{1,x}+\vec{N}_{2,x}+\vec{N}_{3,x})/3$, where $\vec{N}_{1,x}$, $\vec{N}_{2,x}$, and $\vec{N}_{3,x}$ are respectively components of the reference offset $\vec{N}_1$, the reference offset $\vec{N}_2$, and the reference offset $\vec{N}_3$ on the Y axis of the vector sensor 200. The zero-point offset $\vec{M}_0 = \vec{M}_{0,x}+\vec{M}_{0,y}$.

In another embodiment, statistics, such as a median, a weighted average, a variance, and a standard deviation of the plurality of reference offsets $\vec{N}_1$ may be used as the zero-point offset $\vec{M}_0$. The statistics are not enumerated herein.

In some implementations, the vector sensor 200 continuously acquires the reference data, and acquires the reference offset according to the reference data, and continuously updates the current zero-point offset according to the newly acquired reference offset. During adjacent two measurements, postures of the vector sensor 200 relative to the reference vector are different.

For example, the vector sensor 200 acquires first measurement data $M_1$, second measurement data $M_2$, and an angular displacement vector $\theta_{1,2}$ after the first measurement and the second measurement. The angular displacement vector $\theta_{1,2}$ is the angular displacement vector from the posture of the vector sensor 200 during the first measurement and the posture during the second measurement. A vector value |Me| of the reference vector Me is known. According to $M_1$, $M_2$, $\theta_{1,2}$, and |Me|, the reference offset $N_1$ can be acquired. The reference offset $N_1$ is used as the current zero-point offset $M_0$. Then, the vector sensor 200 acquires third measurement data $M_3$ and an angular displacement vector $\theta_{2-3}$ after a third measurement. According to $M_2$, $M_3$, $\theta_{2,3}$, and |Me|, the reference offset $N_2$ can be acquired. An average of $N_1$ and $N_2$ is used as the current zero-point offset $M_0$. Similarly, the vector sensor 200 acquires fourth measurement data $M_4$ and an angular displacement vector $\theta_{3,4}$ after a fourth measurement. According to $M_3$, $M_4$, $\theta_{3,4}$, and |Me|, a reference offset $N_3$ can be acquired. An average of $N_1$, $N_2$, and $N_3$ is used as the current zero-point offset $M_0$. Similarly, the vector sensor 200 continuously acquires the measurement data. When the vector sensor 200 acquires $k^{th}$ measurement data $M_k$ and an angular displacement vector $\theta_{k-1,k}$ after a $k^{th}$ measurement, according to $M_{k-1}$, $M_k$, $\theta_{k-1,k}$, and |Me|, a reference offset $N_{k-1}$ can be acquired. An average of $N_1$, $N_2$, $N_3$, ..., $N_{k-2}$, $N_{k-1}$ is used as the current zero-point offset $M_0$. As such, the vector sensor 200 may continuously acquire the measurement data, and update the current zero-point offset $M_0$ according to the continuously acquired measurement data, so as to ensure that the current zero-point offset $M_0$ is accurate.

Further, in some implementations, the vector sensor 200 continuously acquires the reference data, and acquires the reference offset according to the reference data, and continuously updates the current zero-point offset according to the newly acquired reference offset, and acquires the valid data corresponding to the reference data according to the current zero-point offset and the reference data.

For example, based on the above, after acquiring the reference offset $N_1$ and the current zero-point offset $M_0$ according to $M_1$, $M_2$, $\theta_{1,2}$, and |Me|, the vector sensor 200 acquires the valid data $V_2$ corresponding to $M_2$ according to $M_2$ and $M_0$, where $V_2=M_2-M_0$. That is to say, the valid data $V_2$ is vector data after a zero-point error of the second measurement data $M_2$ is eliminated. Then, the vector sensor 200 performs the third measurement to acquire $M_3$ and $\theta_{2,3}$, acquires the reference offset $N_2$ according to $M_2$, $M_3$, $\theta_{2,3}$, and |Me|, and updates the current zero-point offset $M_0$ according to $N_1$ and $N_2$. After the current zero-point offset $M_0$ is updated, the valid data $V_3$ corresponding to $M_3$ can be acquired according to $M_3$ and $M_0$. Similarly, the vector sensor 200 may continuously acquire the reference data to update the current zero-point offset $M_0$, and may acquire the valid data $V_k$ corresponding to the measurement data $M_k$ according to the $k^{th}$ measurement data $M_k$ and the updated zero-point offset $M_0$. In this way, the vector sensor 200 can normally acquire the zero-point offset $M_0$, that is, the normally outputs the valid data.

In another embodiment, after acquiring the reference offset $N_1$ and the current zero-point offset $M_0$ according to $M_1$, $M_2$, $\theta_{1,2}$, and |Me|, after a next measurement, that is, the third measurement, the vector sensor 200 acquires the valid data $V_3$ corresponding to $M_3$ according to the zero-point offset $M_0$ obtained according to the data of the first measurement and the second measurement and the third measurement data $M_3$, then acquires the reference offset $N_2$ according to $M_2$, $M_3$, $\theta_{2,3}$, and |Me|, and updates the current zero-point offset $M_0$ according to $N_1$ and $N_2$, so as to use the updated zero-point offset $M_0$ after the third measurement for acquiring the valid data $V_4$ during the fourth measurement. Similarly, the vector sensor 200 may acquire valid data $V_{k+1}$ corresponding to measurement data $M_{k+1}$ according to the updated zero-point offset $M_0$ after the $k^{th}$ measurement and $(k+1)^{th}$ measurement data $M_{k+1}$. That is to say, before the sensor acquires the k+1 measurement data $M_{k+1}$, the zero-point offset $M_0$ for acquiring the valid data $V_{k+1}$ has been updated. Therefore, the valid data $V_{k+1}$ can be immediately outputted according to $M_{k+1}$ and $M_0$ acquired by the $k^{th}$ measurement when the sensor acquires k+1 measurement data $M_{k+1}$.

Figure 8:
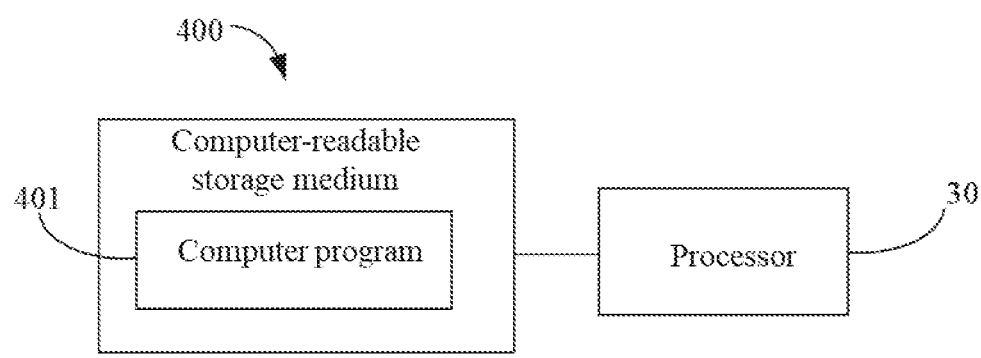
FIG. 8 is a schematic diagram of a connection state between a computer-readable storage medium and a processor according to some implementations of this application.

Referring to FIG. 8, an implementation of this application further provides a non-transitory computer-readable storage medium 400 including a computer program 401. When the computer program 401 is executed by one or more processors 30, the one or more processors 30 are caused to perform the calibration method described in any of the above implementations. The non-transitory computer-readable storage medium 400 may be dispostured in the UAV 1000, or may be dispostured in a cloud server or other apparatuses. In this case, the UAV 1000 can communicate with the cloud server or the other apparatuses to acquire the corresponding computer program 401.

Referring to FIG. 2, for example, when the computer program 401 is executed by one or more processors 30, the one or more processors 30 are caused to perform the methods in 01, 02, 03, 04, 021, 022, and 023. For example, the following application calibration method is performed.

01: Collecting, during a flight of the UAV, reference data during two measurements of a reference vector performed by a vector sensor 200.

02: Acquiring a zero-point offset $M_0$ of the sensor according to the reference data.

03: Acquiring original data $R_k$ of any vector measured by the vector sensor.

04: Acquiring valid data $V_k$ according to the zero-point offset $M_0$ and the original data $R_k$.

05: Controlling headings and postures of the UAV according to the valid data $V_k$.

For another example, when the computer program 401 is executed by one or more processors 30, the one or more processors 30 are caused to perform the following calibration method.

01: Collecting, during a flight of the UAV, reference data during two measurements of a reference vector performed by a vector sensor 200.

021: Acquiring a zero-point offset $M_0$ according to a reference vector value Me, an angular displacement vector $\theta$, first measurement data $M_1$, and second measurement data $M_2$.

022: acquiring a plurality of reference offsets according to a plurality of sets of reference data.

023: Acquiring the zero-point offset $M_0$ according to the plurality of reference offsets.

03: Acquiring original data $R_k$ of any vector measured by the vector sensor.

04: Acquiring valid data $V_k$ according to the zero-point offset $M_0$ and the original data $R_k$.

05: Controlling headings and postures of the UAV according to the valid data $V_k$.

In the description of this specification, description of reference terms such as "some implementations", "in an example" or "exemplary", means including specific features, structures, materials, or features described in the implementation or example in at least one implementation or example of this application. In this specification, schematic descriptions of the foregoing terms are not necessarily with respect to the same implementation or example. In addition, the described specific characteristics, structures, materials, or features may be combined in a proper manner in any one or more implementations or examples. In addition, a person skilled in the art may integrate or combine different embodiments or examples described in the specification and features of the different embodiments or examples as long as they are not contradictory to each other.

Any process or method in the flowcharts or described herein in another manner may be understood as indicating a module, a segment, or a part including code of one or more executable instructions for implementing a particular logical function or process step. In addition, the scope of preferred embodiments of this application includes other implementations which do not follow the order shown or discussed, including performing, according to involved functions, the functions basically simultaneously or in a reverse order, which is to be understood by a person skilled in the art to which the embodiments of this application belong.

Although the implementations of this application are shown and described above, it may be understood that the foregoing implementations are exemplary, and cannot be understood as a limitation to this application. A person of ordinary skill in the art may make changes, modifications, replacements, and variations to the foregoing embodiments without departing from the scope of this application.

What is claimed is:

1. An unmanned aerial vehicle (UAV), comprising:
   a vector sensor for measuring headings and postures of the UAV;
   one or more processors configured to: collect, during a flight of the UAV, reference data during two measurements of a reference vector performed by the vector sensor, wherein modulus of the reference vector is known;
   acquire a zero-point offset of the vector sensor according to the reference data, wherein the zero-point offset is a vector difference between a theoretical zero-point position and a measurement zero-point position of the vector sensor;
   acquire original data of any vector measured by the vector sensor based on the measurement zero-point position;
   acquire valid data based on the theoretical zero-point position according to the zero-point offset $M_0$]] and the original data, define the valid data as a vector data acquired after a zero-point error of the original data is eliminated; and
   control headings and postures of the UAV according to the valid data;
   wherein during the two measurements of the reference vector performed by the vector sensor, postures of the vector sensor are different, the reference data comprises a known reference vector value, an angular displacement vector from the posture of the vector sensor during a first measurement to the posture during a second measurement, first measurement data acquired by the vector sensor during the first measurement of the reference vector, and second measurement data acquired by the vector sensor during the second measurement of the reference vector; and
   wherein the processors are further configured to acquire the zero-point offset according to the reference vector value, the angular displacement vector, the first measurement data, and the second measurement data.

2. The unmanned aerial vehicle (UAV) according to claim 1, wherein the reference data further comprises a plurality of sets of reference data; and
   the one or more processors are further configured to:
   acquire a plurality of reference offsets according to the plurality of sets of reference data; and
   acquire the zero-point offset according to the plurality of reference offsets.

3. A calibration method for navigation of an unmanned aerial vehicle (UAV), the UAV including a vector sensor for measuring headings and postures of the UAV, the calibration method comprising:
   collecting, during a flight of the UAV, reference data during two measurements of a reference vector performed by the vector sensor, wherein modulus of the reference vector is known,
   acquiring a zero-point offset of the vector sensor according to the reference data, wherein the zero-point offset is a vector difference between a theoretical zero-point position and a measurement zero-point position of the vector sensor;
   acquiring original data of any vector measured by the vector sensor based on the measurement zero-point position;
   acquiring valid data based on the theoretical zero-point position according to the zero-point offset and the original data, defining the valid data as a vector data acquired after a zero-point error of the original data, is eliminated; and
   controlling headings and postures of the UAV according to the valid data;
   wherein during the two measurements of the reference vector performed by the vector sensor, postures of the vector sensor are different, the reference data comprises a known reference vector value, an angular displacement vector from the posture of the vector sensor during a first measurement to the posture during a second measurement, first measurement data acquired by the vector sensor during the first measurement of the reference vector, and second measurement data acquired by the vector sensor during the second measurement of the reference vector; and wherein the acquiring the zero-point offset of the vector sensor according to the reference data comprises: acquiring the zero-point offset according to the reference vector value, the angular displacement vector, the first measurement data, and the second measurement data.

4. The calibration method according to claim 3, wherein the reference data further comprises a plurality of sets of reference data; and the acquiring a zero-point offset of the vector sensor according to the reference data comprises:

acquiring a plurality of reference offsets according to the plurality of sets of reference data; and acquiring the zero-point offset according to the plurality of reference offsets.

5. A non-transitory computer-readable storage medium, storing a computer program, wherein when the computer program is executed by one or more processors, the calibration method according to claim 3 is implemented.

6. The non-transitory computer-readable storage medium according to claim 5, wherein the reference data comprises a plurality of sets of reference data; and the acquiring a zero-point offset of the vector sensor according to the reference data comprises: acquiring a plurality of reference offsets according to the plurality of sets of reference data; and acquiring the zero-point offset according to the plurality of reference offsets.

* * * * *